(12) United States Patent
Ribbeck (10) Patent No.: US 7,775,749 B2
(45) Date of Patent: Aug. 17, 2010

(54) METHOD, BAR BLADE, AND USE THEREOF FOR MILLING SPIRAL BEVEL GEARS AND HYPOID GEARS

(75) Inventor: Karl Martin Ribbeck, Remscheid (DE)

(73) Assignee: Klingelnberg GmbH (DE)

( * ) Notice: Subject to any disclaimer, the term of this patent is extended or adjusted under 35 U.S.C. 154(b) by 255 days.

(21) Appl. No.: 10/546,626

(22) PCT Filed: May 12, 2004

(86) PCT No.: PCT/EP2004/005105

§ 371 (c)(1),
(2), (4) Date: Jul. 27, 2006

(87) PCT Pub. No.: WO2004/103624

PCT Pub. Date: Dec. 2, 2004

(65) Prior Publication Data

US 2007/0011855 A1    Jan. 18, 2007

(30) Foreign Application Priority Data

May 22, 2003   (DE) ................................ 103 23 751

(51) Int. Cl.
B26D 1/12 (2006.01)
B23F 5/20 (2006.01)
(52) U.S. Cl. .............................. 407/21; 409/25; 409/27
(58) Field of Classification Search ............. 407/20–22; 409/25–30, 50, 53
See application file for complete search history.

(56) References Cited

U.S. PATENT DOCUMENTS 1,236,834 A    8/1917   Gleason
1,667,299 A    3/1927   Wildhaber
1,865,148 A *  6/1932   Slade .......................... 407/20
2,497,923 A *  2/1950   Bazarnic ...................... 409/26

(Continued)

FOREIGN PATENT DOCUMENTS

CH          300668        10/1954

(Continued)

OTHER PUBLICATIONS

D.H. Bruins, "Werkzeuge und Werkzeugmaschinen", Teil 1, 1968, S. 14-16.

(Continued)

*Primary Examiner*—Eric A Gates
(74) *Attorney, Agent, or Firm*—Michaud-Kinney Group LLP (57) ABSTRACT

In a method and a bar blade for milling spiral bevel gears and hypoid gears, a shaft of the bar blade has a blade profile that is formed by the cross-section of at least one cutting area, at least two free areas, and at least one top area. The blade profile is provided with a first cutting edge for a first flank, a second cutting edge for a second flank that faces the first flank, and a top cutting edge for the bottom of a tooth space. The first and the second cutting edge are embodied as principal cutting edges for completely cutting the first or second flank. The top cutting edge is configured for completely cutting the bottom of the tooth space such that the tooth space comprising the complete final geometry is created in one milling process by means of one and the same bar blade.

12 Claims, 7 Drawing Sheets

U.S. PATENT DOCUMENTS

| | | | |
|---|---|---|---|
| 3,760,476 A * | 9/1973 | Kotthaus | 407/21 |
| 4,144,678 A | 3/1979 | Ellwanger et al. | |
| 4,265,053 A | 5/1981 | Kotthuas | |
| 4,575,285 A | 3/1986 | Blakesley | |
| 4,720,220 A * | 1/1988 | Bloch et al. | 409/33 |
| 5,090,280 A * | 2/1992 | Kosker | 82/158 |
| 5,305,558 A | 4/1994 | Pedersen et al. | |
| 5,480,343 A | 1/1996 | Pedersen et al. | |
| 5,944,587 A * | 8/1999 | Stadtfeld | 451/59 |
| 6,120,217 A | 9/2000 | Stadtfeld et al. | |
| 2001/0028831 A1 * | 10/2001 | Iizuka et al. | 407/21 |
| 2008/0279642 A1 * | 11/2008 | Stadtfeld et al. | 407/21 |

FOREIGN PATENT DOCUMENTS

| | | |
|---|---|---|
| DE | 694 05 978 | 10/1997 |
| EP | 0 686 075 B1 | 10/1997 |
| JP | 55054132 A | 4/1980 |

OTHER PUBLICATIONS

Dr. J. Witthoff, "Die Hartmetallwerkzeuge in der spanabhebenden Formung", 1961, S. 134 u. 135.

George Schneider, "Cutting Tool Applications", 2002, S. 18-21.

Kotthaus, Erich. "Spiral and Hypoid Bevel Gears Based on the Spiroflex Method", Werkstadt und Betrieb (Workshop and Plant), 1967, Issue 8, pp. 602-606.

* cited by examiner

PRIOR ART

PRIOR ART

Fig. 14b

METHOD, BAR BLADE, AND USE THEREOF FOR MILLING SPIRAL BEVEL GEARS AND HYPOID GEARS

FIELD OF THE INVENTION

This invention relates to a method for milling spiral bevel gears and hypoid gears using profile-sharpened or profile-sharpened and additionally form-ground bar cutting blades each having a shank and at one end of the shank a cutting edge profile which, for producing a tooth slot, enables a first tooth flank, at least a portion of the bottom of the tooth slot, and least a portion of a second tooth flank lying opposite said first tooth flank to be cut.

Furthermore, the present invention relates to a profile-sharpened or profile-sharpened and additionally form-ground bar cutting blade for milling spiral bevel gears and hypoid gears, with a shank and with a cutting edge profile formed at one end of the shank by the intersection of at least one rake surface, at least two clearance surfaces and at least one top surface, said cutting edge profile including, for producing a tooth slot, a first cutting edge for a first tooth flank, a second cutting edge for at least a portion of a second tooth flank opposite said first tooth flank, and a top cutting edge for at least a portion of the bottom of the tooth slot.

Finally, the present invention relates to a use of at least one profile-sharpened or profile-sharpened and additionally form-ground bar cutting blade of the aforementioned type.

BACKGROUND OF THE INVENTION

Such a method and such a bar cutting blade are known from DE 694 05 978 T2 which will be discussed in greater detail further below. To quote from the aforementioned document already at this point, in a bar cutting blade referred to as "profile-sharpened", the top surface and the two clearance surfaces are ground to restore and resharpen the cutting blade. In this type of bar cutting blade the rake surface is not ground. Such profile-sharpened bar cutting blades may be used for the removal of stock from the outside or concave flank of a tooth slot (outside cutting blade), from the inside or convex flank of a tooth slot (inside cutting blade) and/or from the bottom of the tooth slot (rough cutting blade). By contrast, in a bar cutting blade referred to as "profile-sharpened and form-ground', sharpening involves grinding the top surface, the two clearance surfaces and the rake surface.

From U.S. Pat. No. 1,667,299 from the year 1928, a form cutting blade is known which is reground only on the rake surface for sharpening. According to the aforementioned definition, a form cuffing blade is a cutting blade known as a "form-ground" cutting blade. Such a form cutting blade or form-ground cutting blade is no bar cutting blade but has a short shank dimensioned as wide as possible in the direction normal to the cutting blade longitudinal axis, because when such a cutting blade is reground stock is ground off in a direction normal to the cutting blade longitudinal axis. The usable profile length for regrinding is determined by the thickness of the form cutting blade normal to the cutting blade longitudinal axis. The profile of the form cutting blade is fixed and cannot be altered by resharpening. The form cutting blade has its two clearance surfaces relieved in an arc-shaped configuration. A variety of pressure angles are obtained by suitably coarsely stepped cutting blades. The shape of the clearance surfaces results necessarily from a selected clearance angle on the top cutting edge and the necessary relief grind. The design constraints with regard to a technologically advantageous clearance and rake angle are accordingly high.

From the article "Spiral- und Hypoidkegelräder nach dem Spiroflex-Verfahren" (spiral and hypoid bevel gears according to the Spiroflex technique) by Erich Kotthaus, German journal "Werkstatt und Betrieb", 1967, pages 602-606, the following additional aspects result in this context. In a form cutting blade the tangent of the flank clearance angle must be equal to the tangent of the normal pressure angle times the tangent of the top clearance angle. For grinding, the cutter head with the form cutting blades held therein is mounted on a special sharpening machine, and each of the form cutting blades has its rake surfaces reground individually in the indexing head until the wear marks on the cutting edges are abraded. In order to be able to cut as many teeth as possible per cutting blade, a long usable profile length is required. The space requirements of a cutting blade on the circumference of the cutter head are hence dependent on the profile length on the cutting blade and the space between two adjacent form cutting blades, which is necessary to ensure passage of the grinding wheel necessary for sharpening. The higher the space requirements, the lower the performance of the cutter head because fewer form cutting blades can then be accommodated on the same circumference and, hence, fewer cuts can be taken per unit of time.

While form cutting blades such as the one from the year 1928 cut the complete tooth slot in a single milling pass, machining techniques and quality demands brought about their replacement already a few years after their introduction, substituting a group of form cutting blades having inside and outside cutting blades of the type then used for decades in the manufacture of spiral bevel gears and hypoid gears (see U.S. Pat. No. 2,024,494 from the year 1935 and Gear Handbook by D. W. Dudley, McGraw-Hill, 1962, pages 20-24 and 20-25). U.S. Pat. No. 2,024,494 describes a cutter head with alternating inside and outside cutting blades, with which both bevel gear flanks of a tooth slot can be finished in a single cut using the same machine settings. It is only in a period after 1960 that these form cutting blade groups, which have been in use since 1935 and are comprised of at least one form cutting blade for cutting the concave flank and one form cutting blade for cutting the convex flank, have been replaced in each case by a group of at least two bar cutting blades. The reasons therefor and the advantages achievable with groups of bar cutting blades are clearly described in the aforementioned article "Spiral- und Hypoidkegelrader nach dem Spiroflex-Verfahren". In this technique, each group of bar cutting blades includes two finishing cutters (one for the concave and one for the convex tooth flank), each having an associated roughing cutter for performing the roughing cut. The combination roughing and finishing cutters are received in a common slot. The mounting of two cutting blades in one slot and the small shank cross-section of these bar cutting blades allow a substantially denser population of cutting blades than would be possible with form cutting blades.

According to the current state of the art, bevel gear milling cutters continue to be used in the form of bar cutting blades. The bar cutting blades used are of high speed steel or carbide. When machining bevel gears in one milling pass, two different cutting edge profile designs of bar cutting blade are used in a cutter head. The bar cutting blades embodying the one design of cutting edge profile machine with the cutting edge arranged on the outside diameter the concave tooth flank (outside cutting blade). Bar cutting blades of this profile design have a special cutting edge geometry leading generally to a positive rake angle. The term positive or negative rake angle is defined, for example, in DIN 6581 of May 1966, page 8, FIG. 13. The bar cutting blades embodying the second design of cutting edge profile machine with the cutting edge arranged on the inside diameter the convex tooth flank (inside cutting blade). Bar cutting blades of this profile design have likewise a special, yet different, cutting edge geometry leading generally also to a positive rake angle. The possibility exists to use one or two roughing cutters in addition to the previously described bar cutting blades.

The number of bar cutting blades adapted to be positioned on a cutter head is limited. Due to the bar cutting blade geometry employed in the prior art, at least two different geometry designs have to be inserted into the cutter head in alternation. In this arrangement only half of the cutting blades can be involved at a time in the generation of the respective tooth flank final geometry.

In the method known as the Oerlikon method for manufacturing bevel gears, the cutter head is equipped with several cutting blade groups each comprised of three bar cutting blades. Each group includes an outside cutter, an inside cutter and a roughing cutter. On each Oerlikon bar cutting blade at least one rake surface and two lateral clearance surfaces at the cutting end are reground. Such cutting blades are designated as triplex flank ground cutting blades or—according to the above definition—as profile-sharpened and additionally form-ground bar cutting blades. Further details relating to the Oerlikon method are contained, for example, in the introductory part of the description of DE 19624685 C1.

In a method according to EP 0 203 085 B1, bar cutting blades of a profile design are used that enable the roughing cutter to be eliminated. Therefore, a group of bar cutting blades includes only two bar cutting blades, which is the reason why more bar cutting blade groups can be accommodated on a cutter head than with the aforementioned Oerlikon method. These bar cutting blades are reground on only two surfaces in the direction of the shank, so that a coating can be applied to the rake surface of these cutting blades which does not necessarily have to be renewed after sharpening, hence prolonging the life between regrinds. Such cutting blades are referred to as duplex flank ground cutting blades or—in accordance with the above definition—as profile-sharpened bar cutting blades.

Cutter heads in which all the bar cutting blades are arranged on a circle such that alternately one bar cutting blade works the concave flank and the next bar cutting blade works the convex flank of one and the same tooth slot, are used in the method referred to as the single indexing manufacturing method. In this method, a tooth slot continues to be machined in one milling pass until the final geometry is obtained. Then an indexing movement to the next tooth slot takes place whereupon this next tooth slot is machined in the next milling pass. By contrast, cutter heads in which the bar cutting blades are arranged in groups find application in the method known as the continuous manufacturing method, in which one cutting blade group machines the convex and the concave flanks in a tooth slot while subsequently the next group of cutting blades enters the next tooth slot where it machines the two tooth flanks. Pertinent details are contained, for example, in the Handbook of Bevel and Hypoid Gears by Hermann J. Stadtfeld, Rochester Institute of Technology, 1993, page 35.

A feature shared by the known methods described in the foregoing is that the machining of a tooth slot invariably requires at least two bar cutting blades whose cutting edge profile is designed to enable the cutting blades jointly to generate a complete final geometry in one milling pass. Furthermore, proper positioning of the individual bar cutting blades of a group of cutting blades in a cutter head is critical and involves an elaborate technique.

A method and a bar cutting blade of the type initially referred to are known from DE 694 05 978 T2 referred to initially. The bar cutting blade is of the profile-sharpened type having its primary or first cutting edge used as outside or inside cutting blade while yet including a second cutting edge on the rake surface in the region of its secondary cutting edge. To obtain the second cutting edge, a slot is produced in the rake surface which forms said second cutting edge whose rake angle differs from the rake angle of the first cutting edge. The second cutting edge cuts a portion of the bottom of the tooth slot as well as a portion of the flank opposite the flank cut by the first cutting edge. The reason for such an elaborate second cutting edge does not become readily apparent from DE 694 05 978 T2. In this document however express reference is made to U.S. Pat. No. 4,575,285. This U.S. patent is based on a prior art in which a cutting blade group is comprised of three cutting blades, i.e., an inside cutting blade, an outside cutting blade and an additional cutting blade for roughing the bottom of the tooth slot. The second cutting edge, which is produced by means of the slot, enables each inside and outside cutting blade to cut not only the associated tooth flank, but also a portion of the opposite flank and a portion of the bottom of the tooth slot. The purpose of this is to omit the need for the roughing cutter and to reduce the cutting blade group to two cutting blades. Hence, two cutting blades per group continue to be necessary in order to be able to generate a tooth slot to its complete final geometry.

Figure 12:
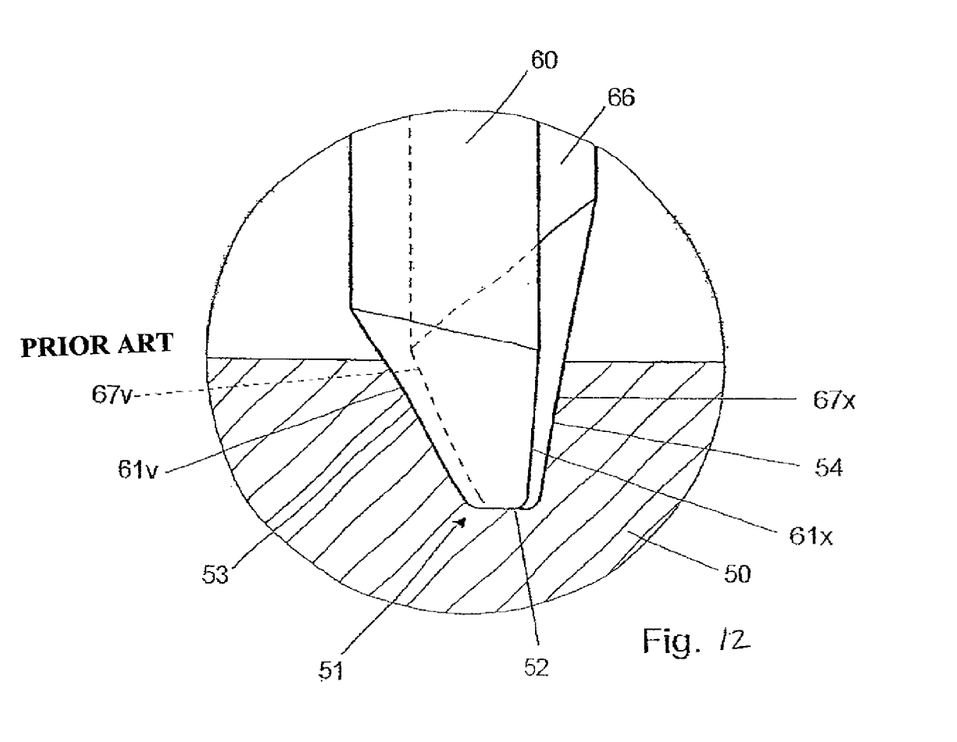
FIG. 12 is a view of a known bar cutting blade group comprised of outside cutting blade and inside cutting blade as engaged with a tooth slot.

Accompanying FIG. 6 illustrates the engagement of a group of cutting blades including an outside cutting blade 60 and an inside cutting blade 66 in a tooth slot 51. The outside cutting blade 60 has a primary cutting edge 61$v$ and a secondary cutting edge 61$x$ opposite the primary cutting edge 61$v$. The inside cutting blade 66 has a primary cutting edge 67$x$ and a secondary cutting edge 67$v$ opposite the primary cutting edge 67$x$. With its primary cutting edge 61$v$, the outside cutting blade 60 machines a first flank 53 of the later tooth slot 51 to provide it with its final geometry. With its secondary cutting edge 61$x$, this cutting blade machines simultaneously another flank, not shown in FIG. 6, which lies opposite the first flank 53. However, said other flank is not part of the tooth slot 51 with its final geometry but is an intermediate flank serving to facilitate the work of the primary cutting edge 67$x$ of the adjoining inside cutting blade 66 of the group, which cutting blade machines a second flank 54 of the tooth slot 51 opposite the first flank 53 to its final geometry. Accordingly, the second cutting edge provided on the profile-sharpened bar cutting blade according to DE 694 05 978 T2 can at best slightly improve the cutting operation of the secondary cutting edge because it has a rake angle differing from the negative rake angle of the secondary cutting edge and amounting to zero degrees in the embodiment illustrated in DE 694 05 978 T2.

It is an object of the present invention to provide a method and a bar cutting blade of the type initially referred to, which enable the positioning of the cutting blades in a cutter head to be simplified and the machining of bevel gears to be performed with substantially enhanced effectiveness. Furthermore it is an object to indicate a special use of the bar cutting blade.

SUMMARY OF THE INVENTION

This object is accomplished in accordance with the invention in that for milling a bevel gear at least one bar cutting blade is used with which each tooth slot is generated to a complete final geometry in one complete milling pass.

Furthermore, proceeding from a bar cutting blade of the type initially referred to, this object is accomplished in accordance with the present invention in that the first and the second cutting edge are designed as cutting edges for completely cutting the first and the second tooth flank, respectively, and that the top cutting edge is designed for completely cutting the bottom of the tooth slot, thus enabling the tooth slot to be generated to its complete final geometry using one and the same bar cutting blade in one milling pass.

With regard to the use, the object of the invention is accomplished in that at least one profile-sharpened or profile-sharpened and additionally form-ground bar cutting blade of the invention is employed in a method for milling spiral bevel gears and hypoid gears with a cutter head, wherein the or each bar cutting blade is arranged in an end face of the cutter head on a circle and in use has the cutting end of the shank protrude from the end face of the cutter head.

The method of the invention can be carried out substantially more easily than the known methods because a single completely cutting bar cutting blade is provided with a cutting edge profile that enables the cutting blade to generate each tooth slot to a complete final geometry in a single milling pass. The entire cutting edge profile of the bar cutting blade entering the tooth slot (outside and inside cutting edges and one top cutting edge) produces the gear final geometry. As a result, the number of cutting edges actively involved in the generation of the gear surface can be doubled while using the same cutter head. The volume of chips being cut per bar cutting blade of the invention can be equally increased a significant amount because the entire profile entering the tooth slot is involved in the machining operation. Wear of the individual bar cutting blade is diminished, because on each cutting blade the complete profile entering the tooth slot is subjected to wear phenomena. The volume of chips to be cut per cutting edge is reduced per gear, resulting in an increased parts output per cutter head population. The positioning of the individual bar cutting blade of the invention in a cutter head is accomplishable with greater ease than in the case of a pair of cutting blades or a group of cutting blades.

In the prior art the bar cutting blade works only one flank. A clearance space exists on the opposite side between the bar cutting blade and the adjacent tooth flank. Chip flow is invariably directed to this clearance space, with the tendency for the chips to enter the clearance space and being trapped between the gear and the bar cutting blade, resulting in damage to the tooth flank.

The cutting edge geometry of the bar cutting blade of the invention results in a changed chip flow which has a beneficial effect on the tooth flank surfaces. Because the cutting edge profile of the bar cutting blade of the invention encompasses the tooth slot completely on entering the tooth slot, the chip is prevented from being trapped in a clearance space between the tooth flank and the bar cutting blade.

The bar cutting blade of the invention is suitable for use with both the generating method and the non-generating method.

Moreover, the bar cutting blade of the invention may be used for performing both roughing and finishing cuts.

The bar cutting blade of the invention may have a cutting edge profile in which the rake surface and/or the clearance surfaces may be curved in any desired shape.

The cutting edge profile design of the bar cutting blade of the invention results in very small rake angles of the cutting edges and consequently in high cutting forces. Conveniently therefore, the bar cutting blade of the invention is used on modern NC hobbing machines.

The field of application of the completely cutting bar cutting blade of the invention is preferably the single indexing method.

In the use of the bar cutting blade of the invention, all the bar cutting blades inserted in the cutter head can be involved in generating the tooth slots to their complete final geometry. This affords the advantage of enabling machining time to be significantly reduced (by up to 50%). Still further, the individual bar cutting blade of the invention is exposed to materially reduced wear.

Novel cutter heads with odd slot numbers may hence find application. By contrast, the prior art conventionally uses cutter heads with even slot numbers, because cutting blade groups with bar cutting blades of two different profile designs are employed.

Cutting blade logistics is dramatically simplified because in use of the bar cutting blade of the invention all the cutting blades may absolutely have the same cutting edge geometry on a cutter head. Equally, the cutting blade turnaround volume and the related costs can be reduced significantly.

Advantageous embodiments of the method and of the bar cutting blade of the invention are the subject-matters of the subclaims.

When in an embodiment of the method of the invention the final geometry is generated by the hobbing method, the manufacture of pinions is possible in particularly simple manner.

When in another embodiment of the method of the invention the final geometry is generated by the plunge milling method, the manufacture of ring gears is possible in particularly simple manner.

When in a still further embodiment of the method of the invention the method involves a rough milling process and/or a finish milling process, the wide variety of uses of the bar cutting blade of the invention becomes apparent.

When in an embodiment of the bar cutting blade of the invention the cutting edge profile is formed by the intersection of one and the same rake surface with at least the two clearance surfaces and the top surface, the cutting edge profile of the bar cutting blade of the invention can be manufactured most easily regardless of whether it is a profile-sharpened or a profile-sharpened and additionally form-ground bar cutting blade.

When in another embodiment of the bar cutting blade of the invention the cutting edge profile is formed by the intersection of two relatively angled rake surfaces with at least the two clearance surfaces and the top surface, the rake angles on the two primary cutting edges may be selected optimally independently of each other.

When in another embodiment of the bar cutting blade of the invention the first and second cutting edges have rake angles equaling zero degrees in either case, this is accomplishable with a plane surface as the rake surface in simple manner by arranging the rake surface parallel to the reference plane against which the rake angle is measured.

When in another embodiment of the bar cutting blade of the invention the first and second cutting edges have rake angles greater than zero degrees in either case, good milling results are obtained also when the bar cutting blade is made of tool steel instead of carbide.

When in another embodiment of the bar cutting blade of the invention the first and the second cutting edges have rake angles smaller than zero degrees in either case, this is accomplishable in simple manner by using two relatively angled rake surfaces which protrude like a rake surface curved in convex fashion relative to the reference plane against which the rake angle is measured. Preferably, such a bar cutting blade should be made of carbide.

When in another embodiment of the bar cutting blade of the invention the first and second cutting edges have rake angles one of which is greater than zero degrees and the other of which is smaller than zero degrees, this is accomplishable in simple manner with a plane surface as the rake surface, which is angled in the one or the other direction relative to the reference plane against which the rake angle is measured.

When in another embodiment of the bar cutting blade of the invention the rake surface is worked into the shank unalterably, the rake surface is not ground during sharpening. Hence a duplex flank ground cutting blade or a profile-sharpened cutting blade is involved.

When in another embodiment of the bar cutting blade of the invention the rake surface between the first and second cutting edges is curved in a concave configuration, positive rake angles result on these two cutting edges.

When in another embodiment of the bar cutting blade of the invention for form-grinding the bar cutting blade, the rake surface is a rake surface to be reground, a triplex flank ground or profile-sharpened and form-ground bar cutting blade is involved, which affords special advantages. In such a cutting blade the rake surface and the two lateral clearance surfaces are freshly coated upon each regrinding operation. This improves the useful life expectancy of the cutting blades considerably.

BRIEF DESCRIPTION OF THE DRAWINGS

Embodiments of the present invention will be described in more detail in the following with reference to the accompanying drawings. In the drawings.

DETAILED DESCRIPTION OF THE PREFERRED EMBODIMENTS

Figure 1:
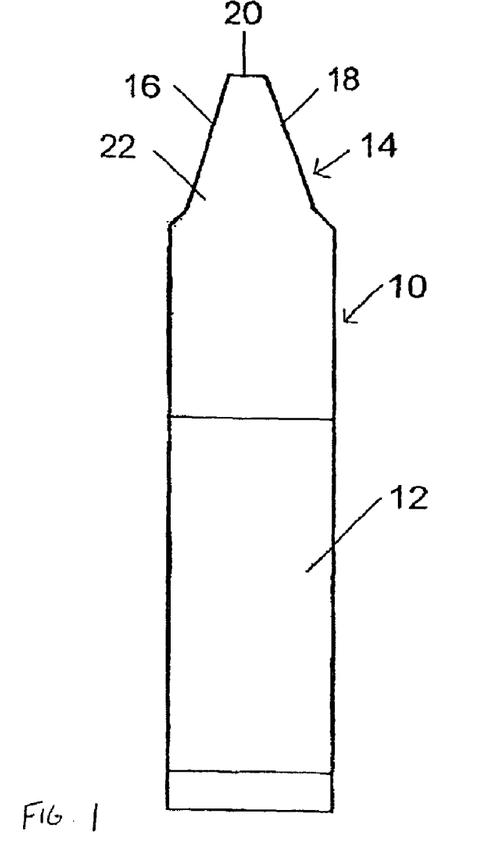
FIG. 1 is a front view of a duplex flank ground or profile-sharpened bar cutting blade illustrating a first embodiment of the bar cutting blade of the present invention.
Figure 2:
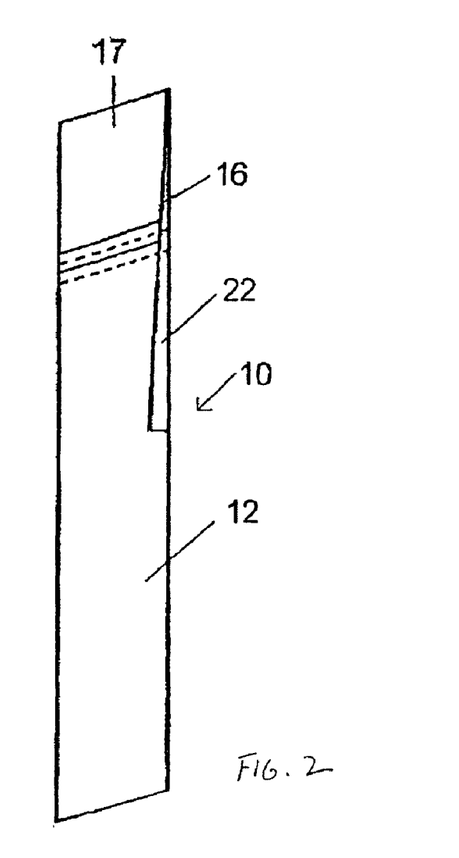
FIG. 2 is a side view of the bar cutting blade of FIG. 1.
Figure 3:
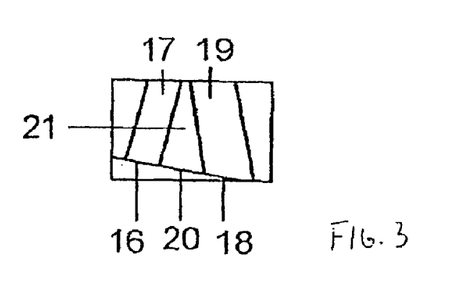
FIG. 3 is a top plan view of the bar cutting blade of FIG. 1.

FIGS. 1-3 shows a bar cutting blade generally designated as 10 and preferably made of carbide, having a shank 12 of rectangular cross-section. The bar cutting blade 10 has at a cutting end 14 with which it protrudes, when in use, from an end face 42 of a cutter head 40 (illustrated in FIGS. 14a and 14b) a cutting edge profile including a first cutting edge 16 for a concave tooth flank 53, a second cutting edge 18 for a convex tooth flank 54, and a top cutting edge 20 for the bottom 52 of a tooth slot 51 of a bevel gear 50 (shown in FIG. 13).

Figure 13:
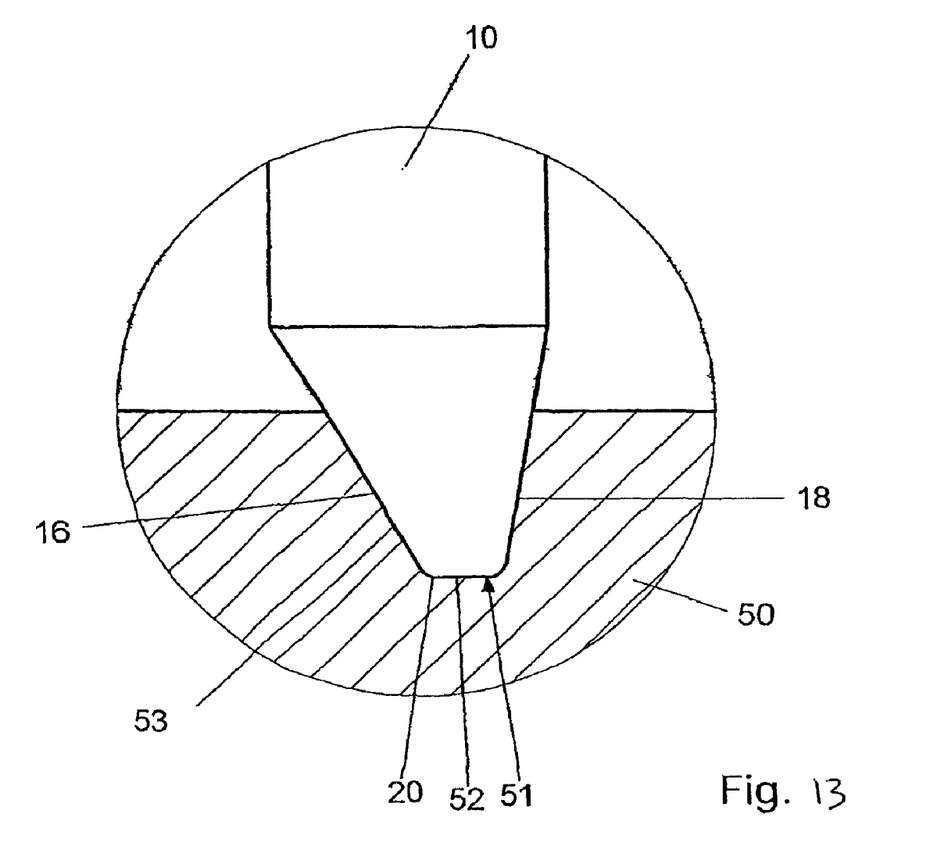
FIG. 13 is a view of the bar cutting blade of the invention as engaged with a tooth slot.
Figure 14A:
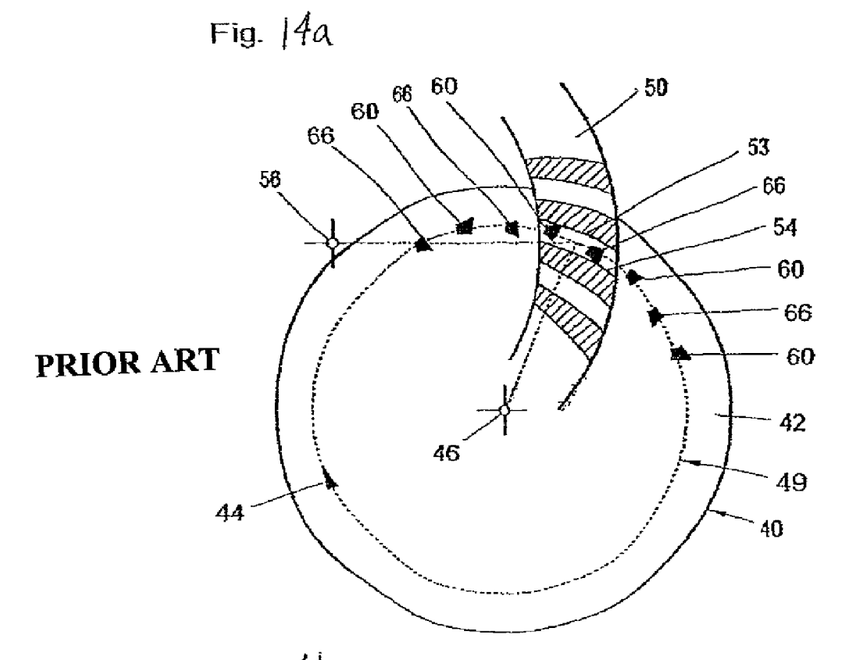
FIG. 14a is a top plan view of a cutter head equipped with known bar cutting blades and, by comparison, of a cutter head equipped with bar cutting blades of the invention (FIG. 14b), each shown during the machining of a bevel gear using the single indexing method.
Figure 14B:
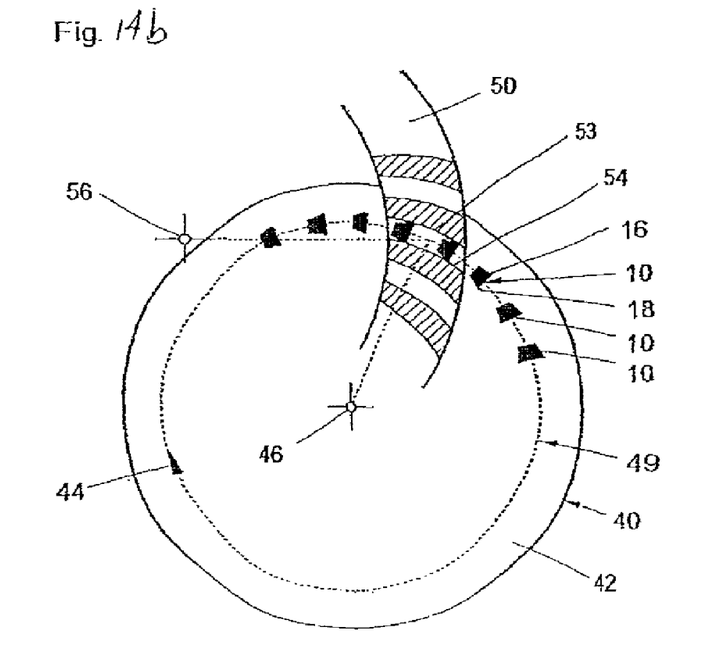

Extending between the first cutting edge 16 and the second cutting edge 18 is a rake surface 22 which in this embodiment is plane and not reground when sharpening the bar cutting blade 10. The cutting edge profile is formed by the intersection of the rake surface 22 with two clearance surfaces 17, 19 and one top surface 21 (FIG. 3). It will be understood that more than two clearance surfaces and more than one top surface may be provided, for example, when each of these clearance surfaces has a secondary surface. The first and the second cutting edge 16, 18 are designed as primary or forming cutting edges for completely cutting the concave and, respectively, convex tooth flanks, and the top cutting edge 20 is designed to completely cut the bottom 52 of the tooth slot, so that in one milling pass using one and the same bar cutting blade 10 the tooth slot 51 can be produced to its complete final geometry. With reference to FIGS. 13 and 14a and 14b a method for milling spiral bevel gears and hypoid gears is described in more detail further below.

The bar cutting blade 10 illustrated in FIG. 1 is a bar cutting blade referred to as a duplex flank ground or profile-sharpened bar cutting blade in which the rake surface 22 is worked into the shank 12 unalterably as becomes apparent from FIG. 2.

Figure 4:
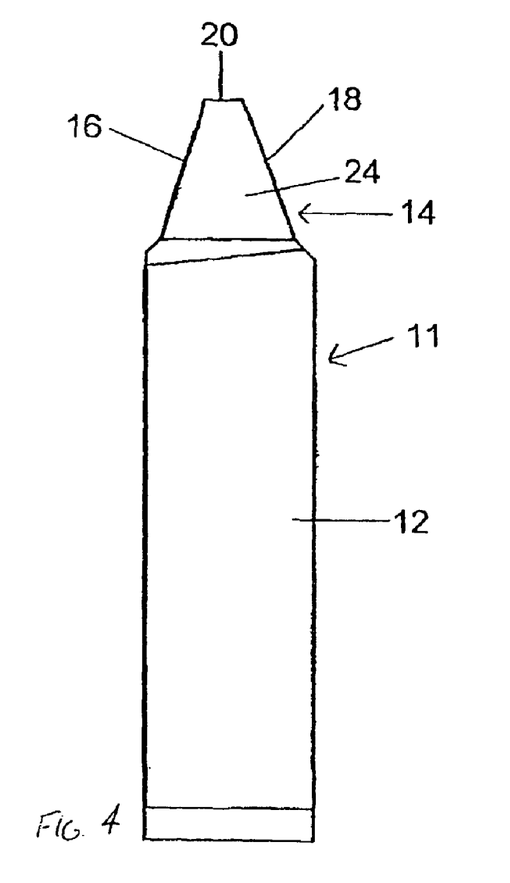
FIG. 4 is a front view of a triplex flank ground or profile-sharpened and form-ground bar cutting blade with a rake surface to be reground, illustrating a second embodiment of the bar cutting blade of the present invention.
Figure 5:
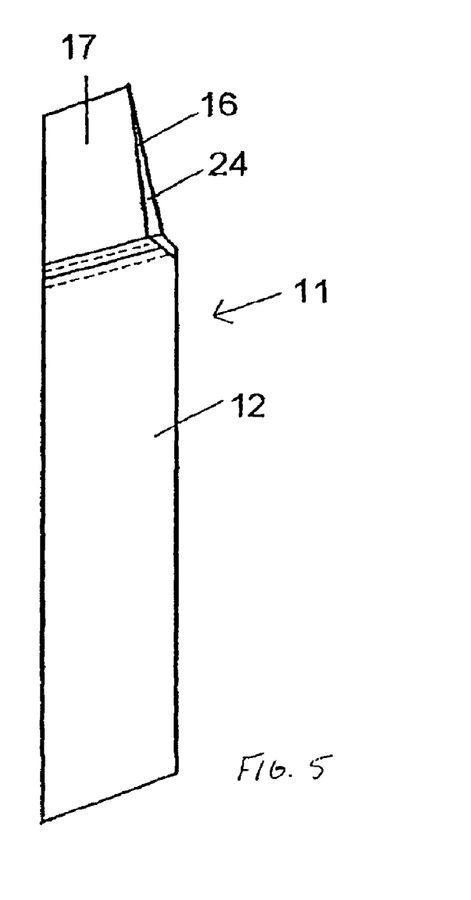
FIG. 5 is a side view of the bar cutting blade of FIG. 4.
Figure 6:
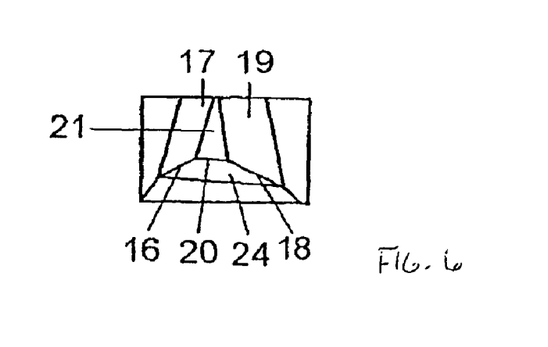
FIG. 6 is a top plan view of the bar cutting blade of FIG. 4.

FIGS. 4-6 show in the same views as in FIGS. 1-3 a bar cutting blade referred to as a triplex flank ground or profile-sharpened and form-ground bar cutting blade 11 which has a rake surface 24 to be reground which, in contrast to the rake surface 22, does not extend into the shank 12. Those parts of the bar cutting blade 11 of FIGS. 4-6 that coincide with corresponding parts of the bar cutting blade 10 of FIG. 1 are assigned like reference numerals and therefore do not need to be described again in FIGS. 1-3.

Figure 7:
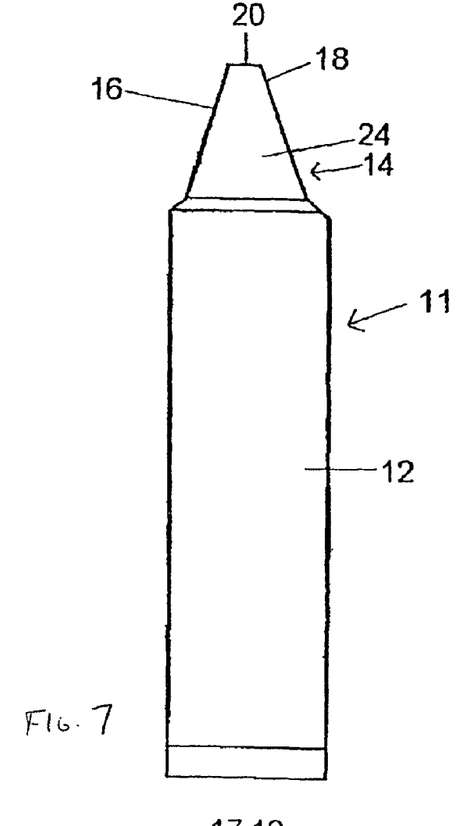
FIG. 7 is a front view of a triplex flank ground or profile-sharpened and form-ground bar cutting blade, in which the rake surface to be reground is arranged different from the embodiment of FIG. 4, illustrating a third embodiment of the bar cutting blade of the present invention.
Figure 8:
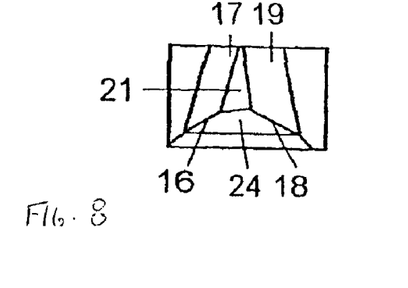
FIG. 8 is a top plan view of the bar cutting blade of FIG. 7.

FIGS. 7 AND 8 show as a third embodiment of the bar cutting blade of the invention the triplex flank ground or profile-sharpened and form-ground bar cutting blade 11 with the rake surface 24 to be reground in a front view (FIG. 7) and in a top plan view (FIG. 8). In contrast to the embodiment of FIGS. 4-6 which shows the general case regarding the orientation of the rake surface 24, the embodiment of FIGS. 7 AND 8 relates to the special case in which the rake surface 24 is oriented in such manner that the two cutting edges 16 and 18 are in a symmetrical relationship to each other resulting in like rake angles $Y_S$ (illustrated in FIG. 11c).

In the bar cutting blade 11 of FIGS. 7 AND 8 the rake angle $Y_S$ differs from the rake angle of the bar cutting blade 11 of FIGS. 4-6, being measured according to the representation of FIGS. 11a-f to be discussed in greater detail further below between the rake surface and a reference plane B of the cutting edge (cf., for example, the representation of FIG. 11a), said reference plane of the cutting edge being the plane of projection in FIGS. 3, 6, 8, 9 and 11a-f. In FIGS. 4-6 the rake angle $Y_S$ on the first and the second cutting edges 16, 18 is unequal to zero degrees, while being equal to zero degrees in FIGS. 7 and 8.

Figure 9:
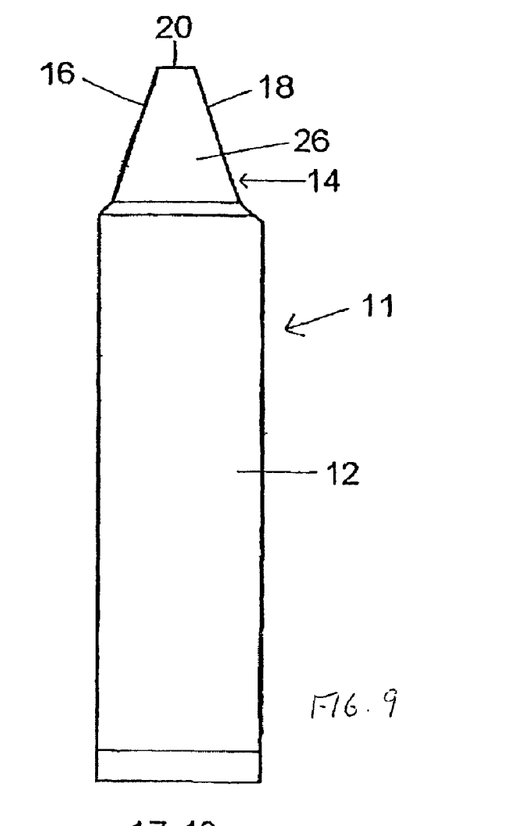
FIG. 9 is a front view of a triplex flank ground or profile-sharpened and form-ground bar cutting blade with a rake surface to be reground, which, in contrast to the other embodiments, is curved in a concave configuration, illustrating a fourth embodiment of the bar cutting blade of the present invention.
Figure 10:
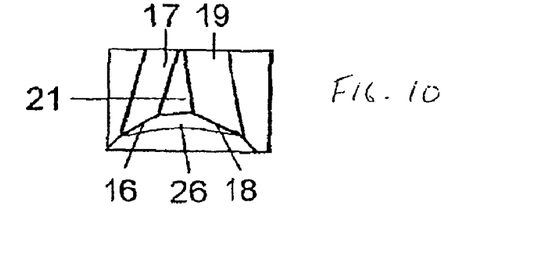
FIG. 10 is a top plan view of the bar cutting blade of FIG. 9.

FIGS. 9 AND 10 show as a fourth embodiment of the bar cutting blade of the invention the triplex flank ground or profile-sharpened and form-ground bar cutting blade 11 with a rake surface 26 to be reground in a front view (FIG. 9) and in a top plan view (FIG. 10). In contrast to the other embodiments, the rake surface 26 between the first and second cutting edges 16, 18 is curved in a concave configuration. In this case both cutting edges 16, 18 result in a positive rake angle.

Figure 11A:
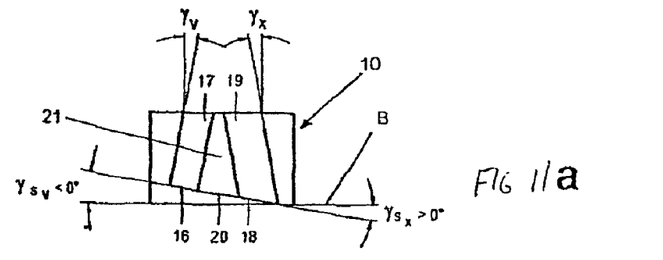
FIGS. 11a-f are views of the size and position of the rake angles for different embodiments of the bar cutting blade of the invention, i.e., in FIG. 11a for the embodiment of FIG. 1, in FIG. 11b for the embodiment of FIG. 4, in FIG. 11c for the embodiment of FIG. 7, in FIG. 11d for an embodiment which, while corresponding to FIG. 4, has its rake surface angled in inverted position relative to the reference plane, in FIG. 11e for the embodiment of FIG. 9, and in FIG. 11f for an embodiment otherwise not shown having two relatively angled rake surfaces.
Figure 11B:
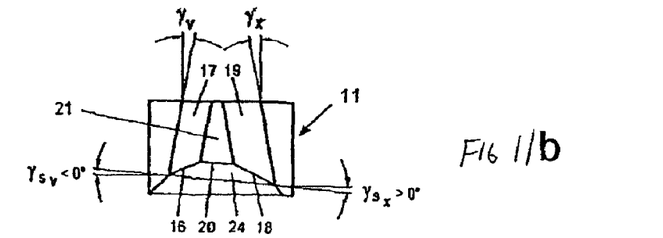
Figure 11C:
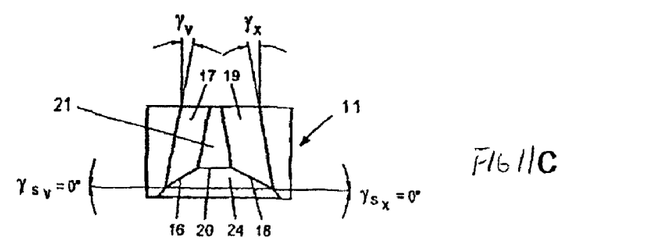
Figure 11D:
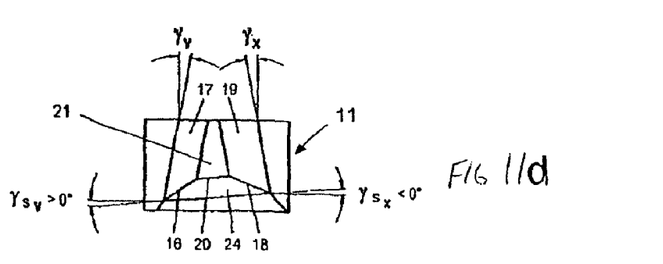
Figure 11E:
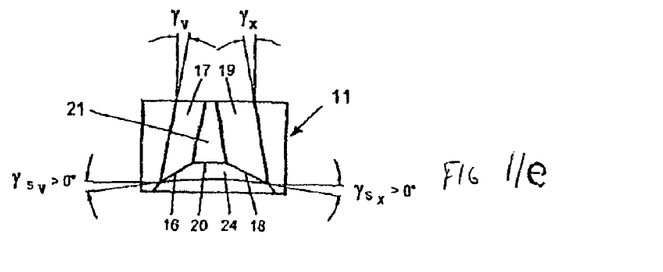
Figure 11F:
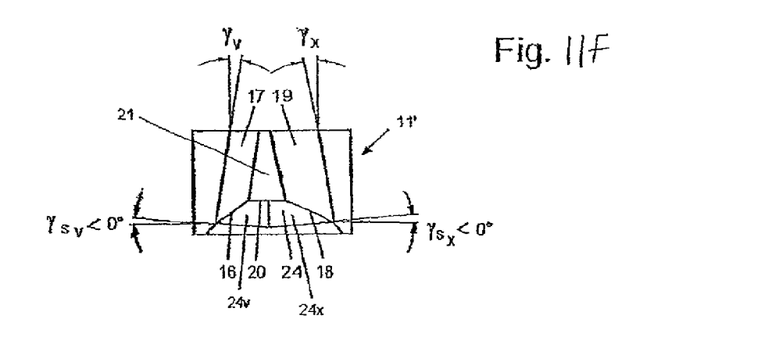

FIGS. 11a-f show the size and the position of the rake angles $Y_S$ for different embodiments of the bar cutting blade of the invention, i.e., in FIG. 11a for the bar cutting blade 10 of FIGS. 1-3, in FIG. 11b for the bar cutting blade 11 of FIGS. 4-6, in FIG. 11c for the bar cutting blade 11 of FIGS. 7 and 8, in FIG. 11d for the bar cutting blade 11 which, while corresponding to FIGS. 4-6, has its rake surface 24 angled in inverted position relative to the reference plane B, in FIG. 11e for the bar cutting blade 11 of FIGS. 9 and 10, and in FIG. 11f for a bar cutting blade 11' otherwise not shown, which has its two rake surfaces 24v and 24s angled relative to each other.

FIGS. 11a, 11b and 11d show bar cutting blades 10 and 11 corresponding to the representations of FIGS. 1-6, respectively, in which the first and second cutting edges 16, 18 have rake angles $Y_S$ of which one is greater than zero degrees and one smaller than zero degrees.

The first cutting edge 16 cuts the concave tooth flank 53, and the second cutting edge 18 cuts the convex tooth flank 54, which is why the rake angles on these two cutting edges are designated as $Y_{SV}$ and $Y_{SX}$, respectively, in accordance with the representations of FIGS. 11a-f. In the bar cutting blade of FIG. 11a the rake angle $Y_{SV}$ is smaller than zero degrees, and the rake angle $Y_{SX}$ is greater than zero degrees. The same applies to the rake angles of the bar cutting blade 11 of FIG. 11b. In the bar cutting blade 11 of FIG. 11d the rake angle $Y_{SV}$ is greater than zero degrees, and the rake angle $Y_{SX}$ is smaller than zero degrees.

In the bar cutting blade 11 of FIG. 11c the first cutting edge 16 and the second cutting edge 18 have rake angles $Y_{SV}$ and $Y_{SX}$ respectively, both equaling zero degrees.

In the bar cutting blade 11 of FIG. 11e in which the rake surface 24 is curved, the first cutting edge 16 and the second cutting edge 18 have rake angles $Y_{SV}$ and $Y_{SX}$, respectively, both being greater than zero degrees.

In the bar cutting blade 11' of FIG. 1f in which the rake surface 24 is composed of two relatively angled rake surfaces 24v, 24x, the first cutting edge 16, which is formed by the intersection of the clearance surface 17 and the rake surface 24v, and the second cutting edge 18, which is formed by the intersection of the clearance surface 19 and the rake surface 24x, have each a rake angle $Y_{SV}$ and $Y_{SX}$, respectively, which is smaller than zero degrees.

A feature common to all the embodiments shown in FIGS. 11a-f is that very small rake angles result which lie in a range of between 0 and ±10°. At positive rake angles the bar cutting blade of the invention may be made of tool steel. In cases where the rake angles equal zero degrees and at negative rake angles the tool should be made of carbide, because at such rake angles tool steel has less favorable wear characteristics.

FIG. 13 shows the bar cutting blade 10 of the invention in engagement with the tooth slot 51. When cutting the tooth slot 51, the cutting edge profile of one and the same bar cutting blade 10 generates the tooth slot 51 to its complete final geometry in a single milling pass. From a comparison between the FIGS. 12 and 13 it becomes readily apparent that the bar cutting blade 10 is substituted for the known cutting blade group comprised of the outside cutting blade 60 and the inside cutting blade 66. The primary cutting edges 61v and 67x of the known cutting blade group have been replaced by corresponding forming cutting edges 16 and 18, respectively, of one and the same cutting blade 10.

FIG. 14a shows in a top plan view a cutter head 40 from the end face 42 thereof protrude known bar cutting blades, that is, outside cutting blades 60 and inside cutting blades 66. The cutting blades 60 and 66 are arranged on a circle 49. The direction of rotation of the cutter head 40 is indicated by an arrow 44. The cutter head 42 rotates about an axis 46. The bevel gear 50 is a ring gear rotating about an axis 56.

FIG. 14b shows for comparison the cutter head 40 equipped with bar cutting blades 10 of the invention. It would also be possible for the bar cutting blades 10 to be provided in a cutting blade ring according to FIG. 14a in addition to the bar cutting blades 60, 66. In FIG. 14a the outside cutting blade 60 machines the concave flank 53, and the inside cutting blade 66 machines the convex flank 54 of the tooth slot. FIG. 12 is a detail of the representation of FIG. 14a, showing that the cutting blades 60, 66 machine also the bottom 52 of the tooth slot 51. In FIGS. 14a and 14b the bevel gear 50 is machined using the single indexing method. This means that the tooth slot 51 is machined in one milling pass until its desired final geometry is obtained. Then an indexing movement takes place, that is, the bevel gear 50 is indexed to the next tooth slot. This next tooth slot 51 is then machined in another milling pass until it is finished, etc. In FIG. 14b one and the same bar cutting blade 10 machines the tooth slot 51 using the first and the second cutting edge 16 and 18, respectively, of the bar cutting blade 10, working the concave and convex flank 53 and 54, respectively, and using the top cutting edge 20 for working the bottom 52 of the tooth slot according to the representation of FIG. 13. The first and the second cutting edges 16, 18 are primary or forming cutting edges for completely cutting the concave and convex flanks 53 and 54, respectively, so that the tooth slot 51 is worked with one and the same bar cutting blade 10 in one milling pass until its complete final geometry is generated. Then follows an indexing movement, the next tooth slot 51 is produced to its complete final geometry in the next milling pass, etc. The bar cutting blades 10 are also arranged on a circle 49 and protrude from the end face 42 of the cutter head 40.

The method of the invention which is carried out using the cutter head 40 and the arrangement of the bar cutting blades 10 of FIG. 14b differs from the known method carried out according to FIG. 14a in that during cutting of the tooth slot 51 with the cutting edge profile of one and the same bar cutting blade 10 in one milling pass the tooth slot 51 is produced to its complete final geometry. In the method of the invention the number of cutting edges actively involved in the production of the teeth of the bevel gear 50 is double the number of the known method, using the same cutter head. The volume of chips being cut per bar cutting blade 10 is significantly higher than the volume removed per known cutting blade 60 or 66, because in the bar cutting blade 10 of the invention the entire profile entering the tooth slot 51 is involved in the cutting action. The profile design of the bar cutting blade of the invention results in very small rake angles of the forming cutting edges 16, 18 and, hence, in extremely high cutting forces which, however, do not pose any problems on the currently available NC hobbing machines.

FIGS. 14a and 14b show each a ring gear as bevel gear. While in the arrangement chosen in FIGS. 11a-f the left-hand cutting edge 16 is assigned to the concave flank, and the right-hand cutting edge 18 to the convex flank of a tooth, this assignment could also be reversed depending on the workpiece to be milled, as, for example, in the representation of FIGS. 14a and 14b.

The field of application of the completely cutting bar cutting blades of the invention is predominantly the single indexing or circular arc manufacturing method, but it will be understood that the bar cutting blades of the invention may also find application in the continuous manufacturing method.

Considering that all the bar cutting blades 10 of the invention inserted in the cutter head 40 are involved in the generation of the final geometry of the bevel gear teeth, the method of the invention affords the advantage over the known method of FIG. 8a of enabling the machining time to be reduced significantly (by up to 50%), with the individual bar cutting blade being subjected to substantially reduced wear.

The invention claimed is:

1. A profile-sharpened or profile-sharpened and additionally form-ground bar cutting blade for milling spiral bevel gears and hypoid gears comprising:

a shank with a cutting edge profile formed at one end of the shank by the intersection of at least one rake surface, at least two clearance surfaces and at least one top surface, said cutting edge profile including, for producing a tooth slot, a first cutting edge for a first tooth flank, a second cutting edge for at least a portion of the second tooth flank opposite said first tooth flank, and a top cutting edge for at least a portion of the bottom of the tooth slot, and wherein the first and second cutting edges are adapted to completely cut the first and second tooth flanks respectively, and that the top cutting edge is adapted to completely cut the bottom of the tooth slot, thus enabling the tooth slot to be generated to a final geometry using one bar cutting blade in one milling pass wherein the at least two clearance surfaces can be ground to provide profile-sharpening of the cutting blade.

2. The bar cutting blade as claimed in claim 1, wherein the cutting edge profile is formed by the intersection of one rake surface with at least the two clearance surfaces and the top surface.

3. The bar cutting blade as claimed in claim 1, wherein the cutting edge profile is formed by the intersection of two relatively angled rake surfaces with at least the two clearance surfaces and the top surface.

4. The bar cutting blade as claimed in claim 1, wherein the first and second cutting edges have rake angles ($Y_{SX}$ and $Y_{SV}$) greater than about zero degrees.

5. The bar cutting blade as claimed in claim 4, wherein the rake surface between the first and second cutting edges is curved in a concave configuration.

6. The bar cutting blade as claimed in claim 1, wherein the first and second cutting edges have rake angles smaller than about zero degrees in either case.

7. The bar cutting blade as claim 1, wherein the first and second cutting edges have rake angles ($Y_{SX}$ and $Y_{SV}$) one of which is greater than about zero degrees and the other of which is smaller than about zero degrees.

8. The bar cutting blade as claimed in claim 1 wherein the rake surface is worked into the shank.

9. The bar cutting blade as claimed in claim 1, wherein for form-grinding the bar cutting blade at least one rake surface is a rake surface to be reground.

10. A profile-sharpened or profile-sharpened and additionally form-ground bar cutting blade as claimed in claim 1 wherein the bar cutting blade is mountable in an end face of a cutter head on a circle and wherein a cutting end of the shank protrudes from the end face of the cutter head.

11. The bar cutting blade as claimed in claim 1, wherein the first and second cutting edges define rake angles ($Y_{SX}$ and $Y_{SV}$) of about zero degrees.

12. The bar cutting blade as claimed in claim 1, wherein the first and second cutting edges have rake angles ($Y_{SX}$ and $Y_{SV}$) of 0 to −10 degrees.

* * * * *